(12) United States Patent
Akavuti et al.

(10) Patent No.: US 9,027,458 B2
(45) Date of Patent: May 12, 2015

(54) FLOATING FLOOR ASSEMBLY FOR ARMORED VEHICLES

(75) Inventors: Ron V. Akavuti, San Jose, CA (US); Amikam Shmargad, Foster City, CA (US)

(73) Assignee: BAE Systems Land & Armaments, L.P., Santa Clara, CA (US)

( * ) Notice: Subject to any disclaimer, the term of this patent is extended or adjusted under 35 U.S.C. 154(b) by 228 days.

(21) Appl. No.: 13/606,651

(22) Filed: Sep. 7, 2012

(65) Prior Publication Data

US 2014/0109757 A1 Apr. 24, 2014

Related U.S. Application Data

(60) Provisional application No. 61/531,816, filed on Sep. 7, 2011.

(51) Int. Cl.
*F41H 7/00* (2006.01)
*F41H 5/013* (2006.01)
*F41H 7/04* (2006.01)

(52) U.S. Cl.
CPC ................ *F41H 5/013* (2013.01); *F41H 7/042* (2013.01)

(58) Field of Classification Search
USPC ............... 89/36.08, 36.09, 36.12, 929, 36.02; 114/14, 13; 296/187.07, 187.08, 296/193.07
See application file for complete search history.

(56) References Cited

U.S. PATENT DOCUMENTS

| | | | |
|---|---|---|---|
| 4,593,870 A * | 6/1986 | Cronkhite et al. ........ 244/117 R |
| 6,658,984 B2 | 12/2003 | Zonak | |
| 6,779,431 B2 * | 8/2004 | Honlinger ................ 296/193.07 |
| 7,255,034 B2 | 8/2007 | Strassgurtl et al. | |
| 7,954,419 B2 | 6/2011 | Ran et al. | |
| 8,020,926 B2 * | 9/2011 | Enns ......................... 296/193.12 |
| 8,424,443 B2 * | 4/2013 | Gonzalez .................... 89/36.02 |
| 8,656,822 B1 * | 2/2014 | Saucedo ...................... 89/36.02 |
| 2008/0173167 A1 | 7/2008 | Mills et al. | |
| 2009/0056529 A1 | 3/2009 | Hinze et al. | |
| 2009/0140545 A1 * | 6/2009 | Greuter et al. ........... 296/187.07 |
| 2009/0266226 A1 | 10/2009 | Beach et al. | |
| 2010/0239374 A1 | 9/2010 | Davis et al. | |
| 2012/0210861 A1 * | 8/2012 | Tobie ........................... 89/36.04 |

FOREIGN PATENT DOCUMENTS

| WO | WO 2007/020531 | 2/2007 |
| WO | WO 2010/090661 | 8/2010 |

OTHER PUBLICATIONS

International Preliminary Report on Patentability from related PCT Application PCT/US2012/054179, dated Mar. 20, 2014, 9 pgs.
International Search Report and Written Opinion for PCT Application PCT/US2012/054179, dated Jun. 2, 2013, 12 pgs.

* cited by examiner

*Primary Examiner* — Reginald Tillman, Jr.
(74) *Attorney, Agent, or Firm* — Patterson Thuente Pedersen, P.A.

(57) ABSTRACT

A floating floor assembly for an armored vehicle mounted to the sides of the vehicle to suspend the floor above the belly armor of the vehicle rather than being directly supported by the belly armor. The floating floor reduces the amount of energy that is transferred by the floating floor from the belly plate and further reduces the risk that any deformation of the belly armor from the explosion will cascade to the floating floor causing the floor to buckle or fragment into secondary shrapnel.

10 Claims, 6 Drawing Sheets

FLOATING FLOOR ASSEMBLY FOR ARMORED VEHICLES

RELATED APPLICATION

The present application claims the benefit of U.S. Provisional Application No. 61/531,816, filed Sep. 7, 2011, which is incorporated herein by reference in its entirety.

FIELD OF THE INVENTION

The present invention is generally directed to a floor assembly for an armored vehicle. Specifically, the present invention is generally directed to a floating floor assembly that suspends the flooring above the belly armored minimizing the effect of an explosive event originating beneath the vehicle on the crew compartment.

BACKGROUND OF THE INVENTION

An armored vehicle typically comprises armor paneling mounted on the sides, roof and the bottom of the vehicle. The substantial weight of the armor paneling creates a tradeoff between the operational weight of the vehicle that can be effectively handled by the engine versus the amount of armor necessary to protect the occupants and critical systems of the vehicle. Accordingly, the vehicle armor is typically concentrated at the sides of the vehicle where majority of the hostile fire will likely strike the vehicle, while the top and the bottom of the vehicle are relatively lightly armored. The side armor paneling used for armored vehicles has improved to the extent that penetrating the side armor of a vehicle with conventional weaponry has become very difficult. Advanced weaponry, such as High Explosive Anti-Tank ("HEAT") warheads fired by large bore cannons, is often required to eliminate, to destroy or disable an armored vehicle through the side armor.

Accordingly, many anti-armored vehicle weapon systems used by combatants without access to advanced weaponry seek to exploit the vulnerable underbelly or top of the vehicle rather than seeking to overcome the thicker armor at the sides of the vehicle. In particular, mines and improvised explosive devices (IEDs) exploit the thin belly armor of most armored vehicles by detonating beneath the vehicle to direct shrapnel and a concussive blast into the crew compartment. Even if the belly armor dampens the explosive energy of the mine or IED, the close proximity of the explosion beneath the vehicle still creates a substantial risk of injury to the occupants and critical systems of the vehicle.

In addition, as the flooring of the crew compartment is commonly affixed directly to the belly armor, any damage or deformation of the belly armor from the explosion could cause the floor of the crew compartment to buckle and injure the occupants. Similarly, any explosive energy directed at the underlying armor can be conducted directly through the flooring into the crew compartment. Although the armor plating and the flooring will dampen the explosive energy, the amount of explosive energy transferred to the lower extremities of the occupants can be sufficient to cause injury to the occupants' extremities or knock the occupants around the crew compartment causing additional injury.

Similarly, the flooring provides minimal protection once the belly armor is breached. As a result, shrapnel from the explosion that penetrates the thin armor plating on the underside of the vehicle or penetrates through damaged portions of the armor plating can typically easily penetrate the flooring and enter the crew compartment. In addition, the explosive energy directly transferred from the belly armor into the flooring panel can cause the flooring panel itself to fragment creating additional shrapnel in the crew compartment. The flying shrapnel within the confined crew compartment creates a substantial risk of serious injury or death.

In recent years, however, the development of armor systems for protecting the underside of the crew compartment has remained relatively stagnant. As a result, even modern vehicles with advanced armor paneling are still susceptible to mines and IEDs that detonate beneath the vehicle leading to the increased use of IEDs and mines in certain conflicts where advanced weaponry may not be readily available. Consequently, there is a need for improved protection of the underside of crew compartments for armored vehicles.

SUMMARY OF THE INVENTION

The present invention is directed to a flooring assembly that mounts at least one flooring panel for a crew compartment to the sides of the vehicle to float the flooring panels above the belly armor of the vehicle rather than affixing the flooring panels to the belly armor to support the flooring panels. The lack of direct support by the belly armor to the floating flooring panels eliminates structural conduits through which explosive energy can be transmitted from the belly armor to the flooring panels of the crew compartment. Although the explosive energy can travel through from the belly armor into the sides of the vehicle to eventually reach the flooring panels, the explosive energy will be significantly more dissipated by the additional material through which the energy must travel than had the energy been directly transferred into the flooring panels from the belly armor. In addition, the explosive energy must travel through the significantly thicker side armor paneling, which can dissipate the explosive energy over a greater amount of material. Similarly, the floating flooring panels reduce the risk that any deformation of the belly armor from the explosion will cascade to the flooring and cause the flooring to buckle or fragment into secondary shrapnel.

A flooring assembly, according to an embodiment of the present invention, comprises at least one flooring panel and a support assembly for mounting the flooring panel to the walls of the vehicle to suspend the flooring panel above the belly armor of the vehicle. In one aspect, the mount assembly can further comprise at least two elongated primary support beams positioned in parallel to support the flooring panel. Each primary support beam comprises at least one wall mount at each end of the beam for affixing the primary support beam to the side wall of the vehicle. The wall mounts are positioned on the side walls of the vehicle such that the corresponding primary support beam is positioned a predetermined distance above the belly armor. Each flooring panel can be suspended between the primary support beams above the belly armor to define a gap between the underside of each floor panel and the top of the belly armor Similarly, the gap provides an expansion space in which the belly armor can buckle without impacting the flooring panels and causing the flooring panels to buckle and/or fracture. In one aspect, each flooring panel can further comprise at least one plate retainer for affixing the flooring panel to the corresponding support beam supporting the flooring panel.

According to an embodiment, the support assembly can further comprise at least two secondary support beams mounted in parallel to support at least one flooring panel. Each secondary support beam comprises a wall mount at one end and a beam mount at the opposite end. In one aspect, the secondary support beams are positioned such that the secondary support beams intersect the primary support beams. The wall mount of each of the secondary support beams operate in the same way as the wall mounts of the primary support beams by mounting one end of the secondary support beam to a sidewall of the vehicle. The beam mount can be affixed to a perpendicular primary support beam to position the secondary support beam at the predetermined distance above the belly armor. The secondary support beams can be used in conjunction with the primary support beams to support a plurality of flooring panels in an irregularly shaped crew compartment.

According to an embodiment, at least one torsion bar strap can be positioned between the parallel support beams. Each torsion bar strap is adapted to twist in response to an explosive force reaching the support beams to absorb and further dissipate the explosive energy to minimize the impact of the explosive energy on the supported flooring panels.

According to an embodiment, the floating floor can further comprise a containment blanket positioned beneath the flooring panels for capturing shrapnel from the IED or created by damage to the belly armor. The containment blanket can further comprise a steel weave adapted to prevent the shrapnel from cutting and penetrating through the containment blanket to strike the floor plating. The containment blanket minimizes or eliminates the shrapnel that could enter the crew compartment due to the explosion.

A flooring assembly, according to an embodiment of the present invention, can comprise at least one floor panel having at least one structural mount on the periphery of the floor panel. In one aspect, the structural mount is adapted to mount the floor panel directly to a sidewall or a structure within the vehicle such as the center console for the cockpit. Directly mounting the floor panel to a wall or structure permits positioning of the floor panel in areas where support beams cannot easily fit, such as beneath the driver in the cockpit. In this configuration, the floor panel can be contoured to accommodate a seated occupant. In one aspect, the entire floor panel can be affixed to the side wall directly.

A method, according to an embodiment of the present invention, for protecting the crew compartment from explosive events occurring below the vehicle, can generally comprise mounting at least two support beams to the side walls of the vehicle, wherein the support beams are positioned parallel to each other and are a predetermined distance above the belly armor. A flooring panel can then be positioned over the parallel support beams. At least one plate retainer is then inserted through the flooring panel into the underlying support beam to mount the flooring panel to the corresponding support beam. According to an embodiment, a containment blanket can be positioned between the flooring panel and the support beam to capture shrapnel from or generated by the explosive device.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE CLAIMS

The invention can be completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
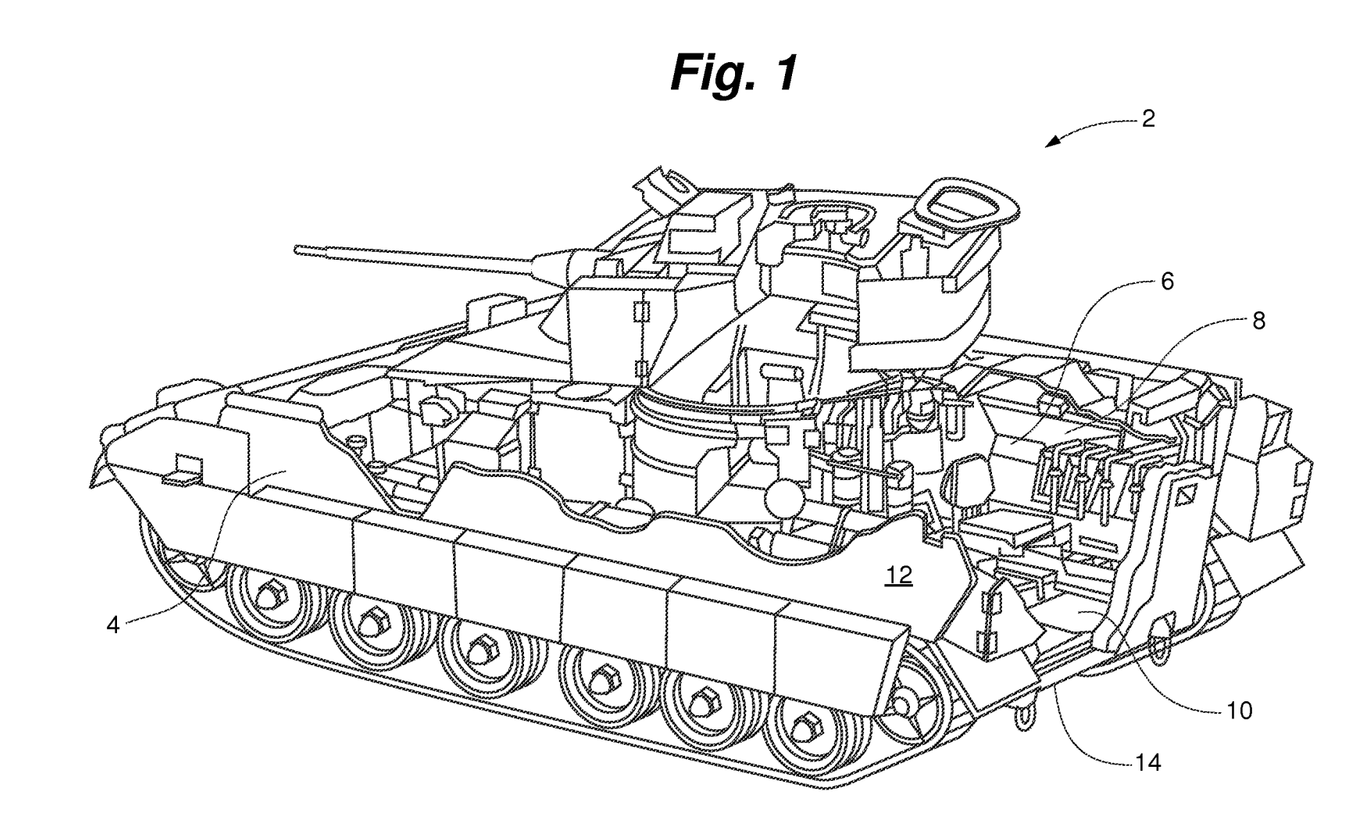
FIG. 1 is cutaway schematic view of a representative armored vehicle for use with the present invention.

As shown in FIG. 1, a vehicle 2 for use with the present invention can generally comprise a crew compartment 6 and an armored hull 4. The crew compartment 6 can further comprise at least two opposing sidewalls 8 and a floor 10. Similarly, the armored hull 4 can further comprise at least two opposing side armor sections 12 and a belly armor section 14 positioned beneath the floor 10. As depicted, the vehicle 2 is a Bradley Infantry Fighting Vehicle (IFV), but can comprise any wheeled or tracked armored vehicle.

Figure 2:
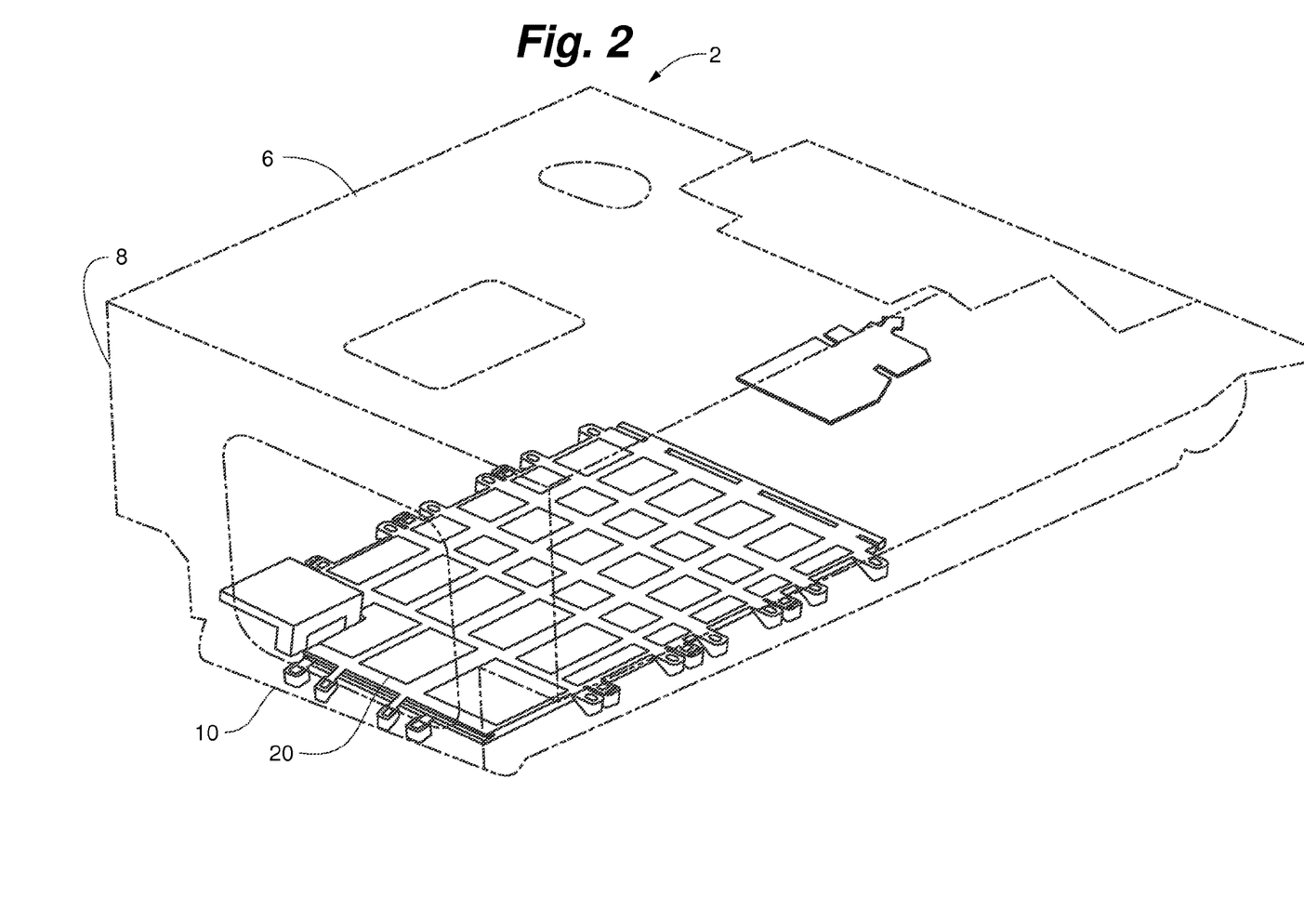
FIG. 2 is a wireframe perspective view of an armored vehicle having a floating floor according to an embodiment of the present invention.
Figure 3:
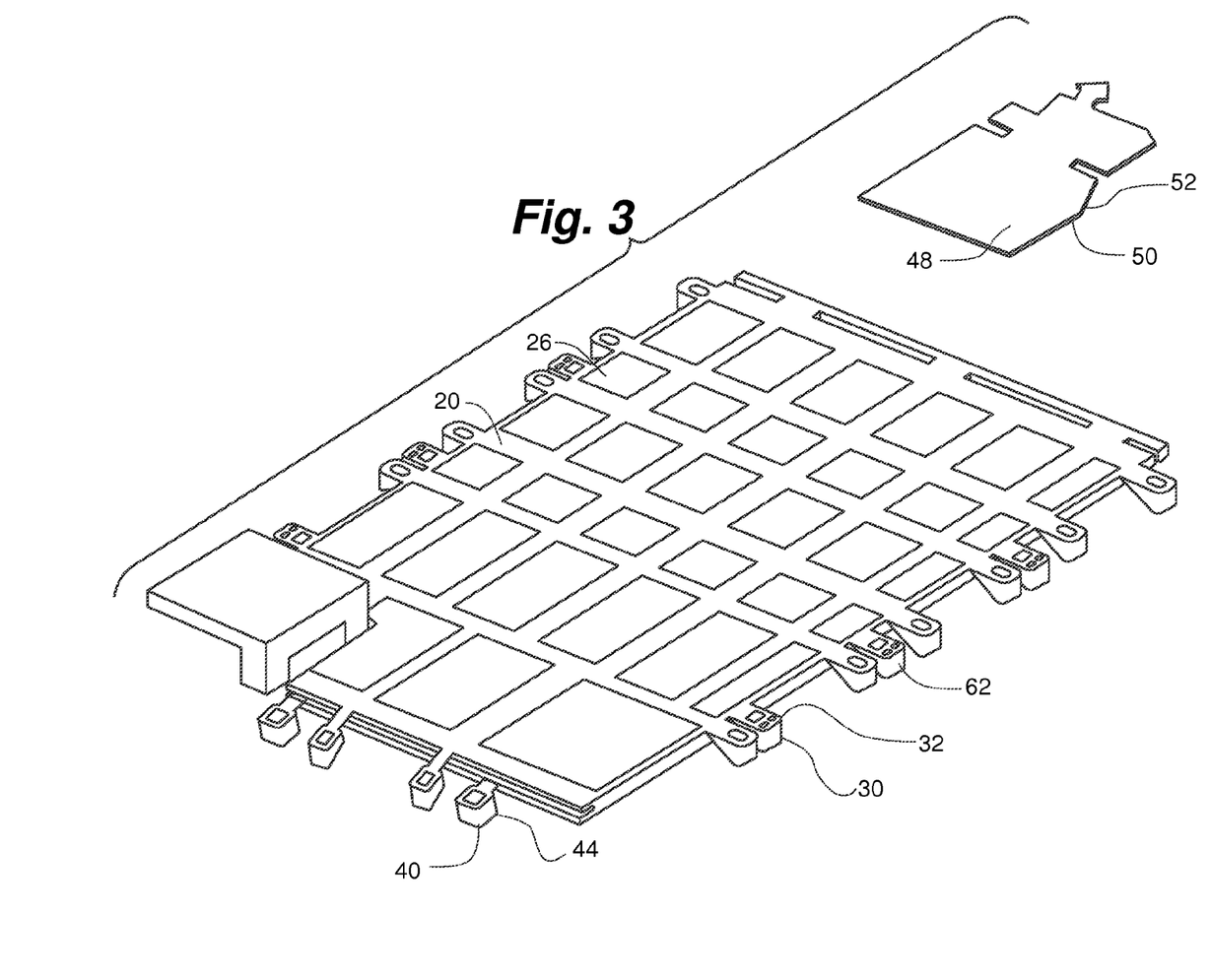
FIG. 3 is a perspective view of the floating floor according to an embodiment of the present invention.
Figure 4:
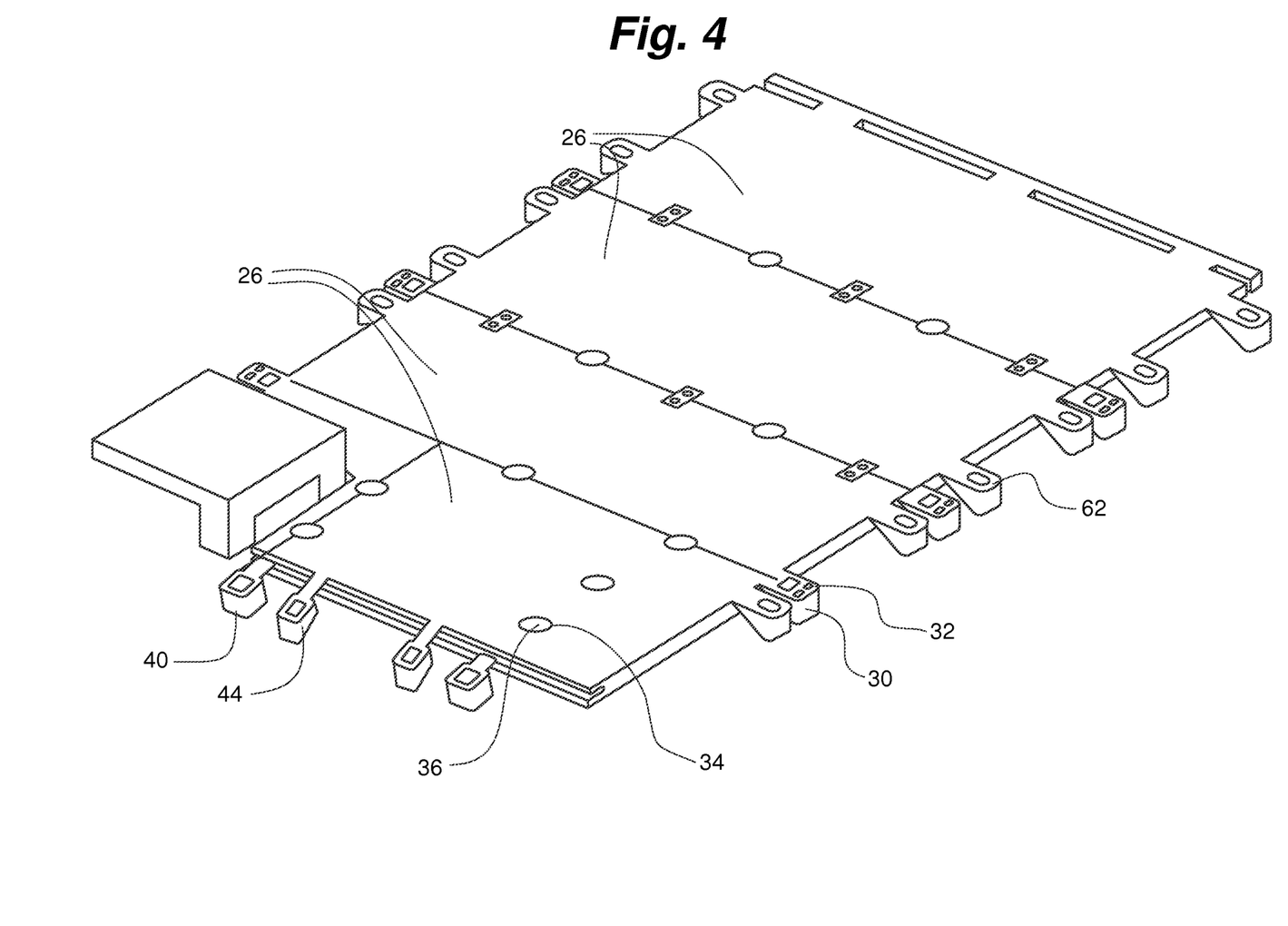
FIG. 4 is a perspective view of the floating floor of FIG. 3 with the containment blanket removed.
Figure 5:
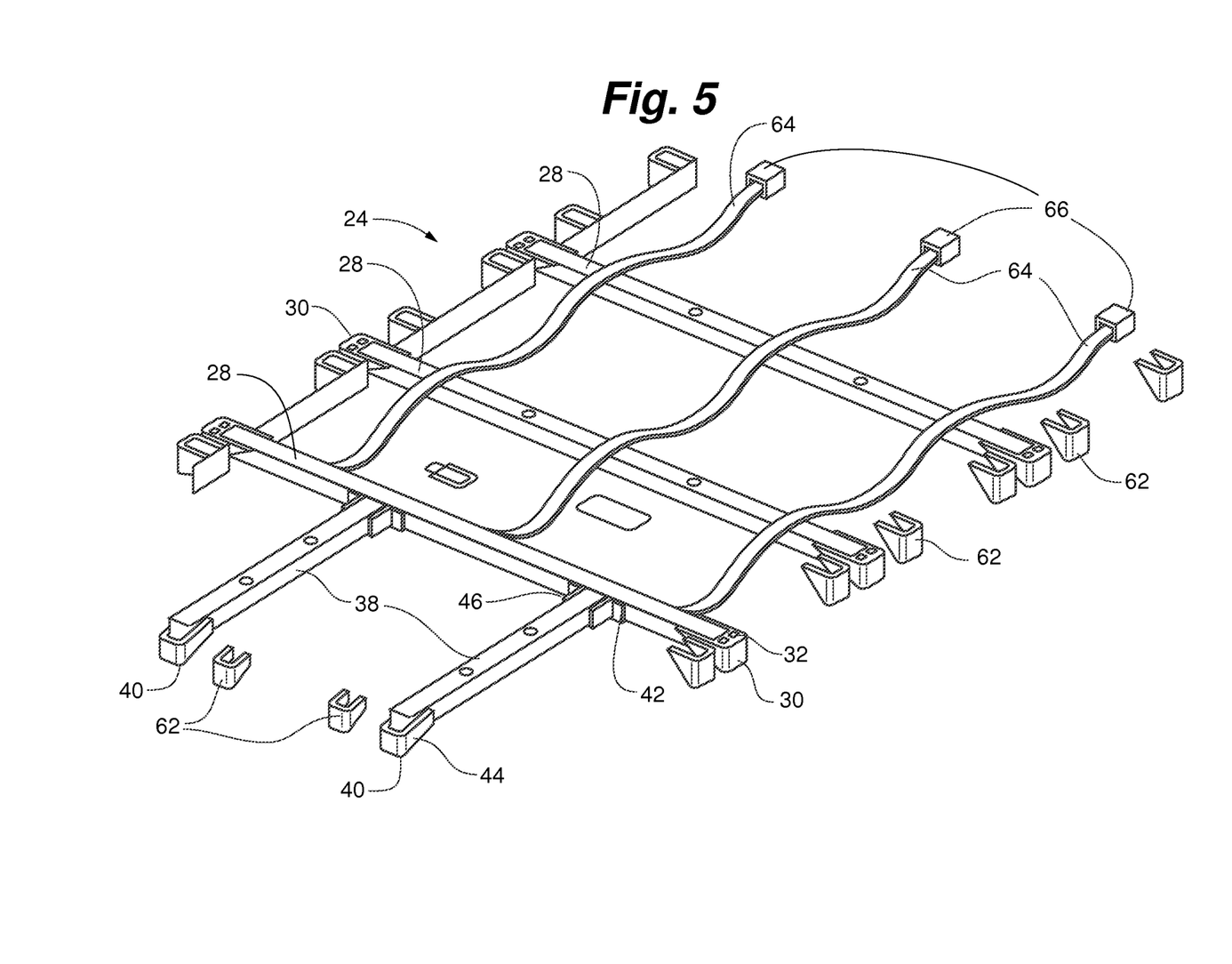
FIG. 5 is a perspective view of the support assembly of the floating floor depicted in FIG. 3.

As shown in FIGS. 2-3 and 5, a floating floor system 20 comprises a support assembly 24 and at least one flooring panel 26. The support assembly 24 can further comprise at least two primary support beams 28 each having a wall mount 30 adapted to receive a fastener 32 and affixed to each end of the support beam 28. In one aspect, at least one wall mount 30 can be positioned at each end of each primary support beam 28. Each flooring panel 26 can further comprise at least one plate retainer 34 for receiving at least one fastener 36.

As shown in FIGS. 2 and 5, the fastener 32 is inserted through the wall mount 30 to affix each end of the support beam 28 to the sidewalls 8 of the crew compartment 2. The fastener 32 can comprise screws, bolts, rivets or other conventional fastener. Alternatively, the wall mounts 30 can be welded to the sidewalls 8 rather than secured with a fastener 32. The wall mounts 30 are affixed to the sidewalls 8 such that there is a predetermined distance between the belly armor section 12 and the bottom of the support beam 28. The predetermined distance is set to minimize the explosive effect. The predetermined distance creates a gap between the underside of each flooring panel 26 and the topside of the belly armor section 12 to prevent damage to the belly armor section 12 from cascading into the flooring panel 26. The fastener 36 can then be inserted through the plate retainers 34 and into the support beam 28 to affix the flooring panel 26. The fastener 36 can comprise screws, bolts, rivets or other conventional fastener. Alternatively, the flooring panel 26 can be welded to the support beam 28.

As shown in FIG. 5, the support assembly 24 can further comprise at least two secondary support beams 38 each having a wall mount 40 affixed to one end of secondary support beam 38 and a beam mount 42 affixed to the opposite end of the secondary support beam 38. The wall mount 40 is adapted to receive a fastener 44 or be welded to the sidewalls 8 to secure the secondary support beam 38 to the side walls 8. Similarly, the beam mount 42 is adapted to receive a fastener 46 or be welded. The fastener 44, 46 can comprise screws, bolts, rivets or other conventional fastener. In operation, the wall mount 40 is mounted to the sidewall 8 while the beam mount 42 is mounted to a perpendicular primary support beam 28 to position the secondary support beams 38 at the predetermined distance from the belly armor section 14.

As shown in FIG. 2, the floating floor system 2, according to an embodiment, can further comprise at least one direct mount floor panel 48 having at least one structural mount 50 positioned along the periphery of the floor panel 48. Each structural mount 50 is adapted to receive a fastener 52 for affixing the structural mount 50 to a structure such as a sidewall or center console. In operation, the direct mount floor panel 48 is mounted to the sidewalls 8 and/or structure within the crew compartment 2 such that the floor panel 48 is at least the predetermined distance above the belly armor section 14. In one aspect, the floor panel 48 can shaped to correspond to the entire bottom floor of the vehicle 2 such that the floor panel 48 can be affixed to the vehicle 2 to define a floor for the crew compartment 6.

Figure 6:
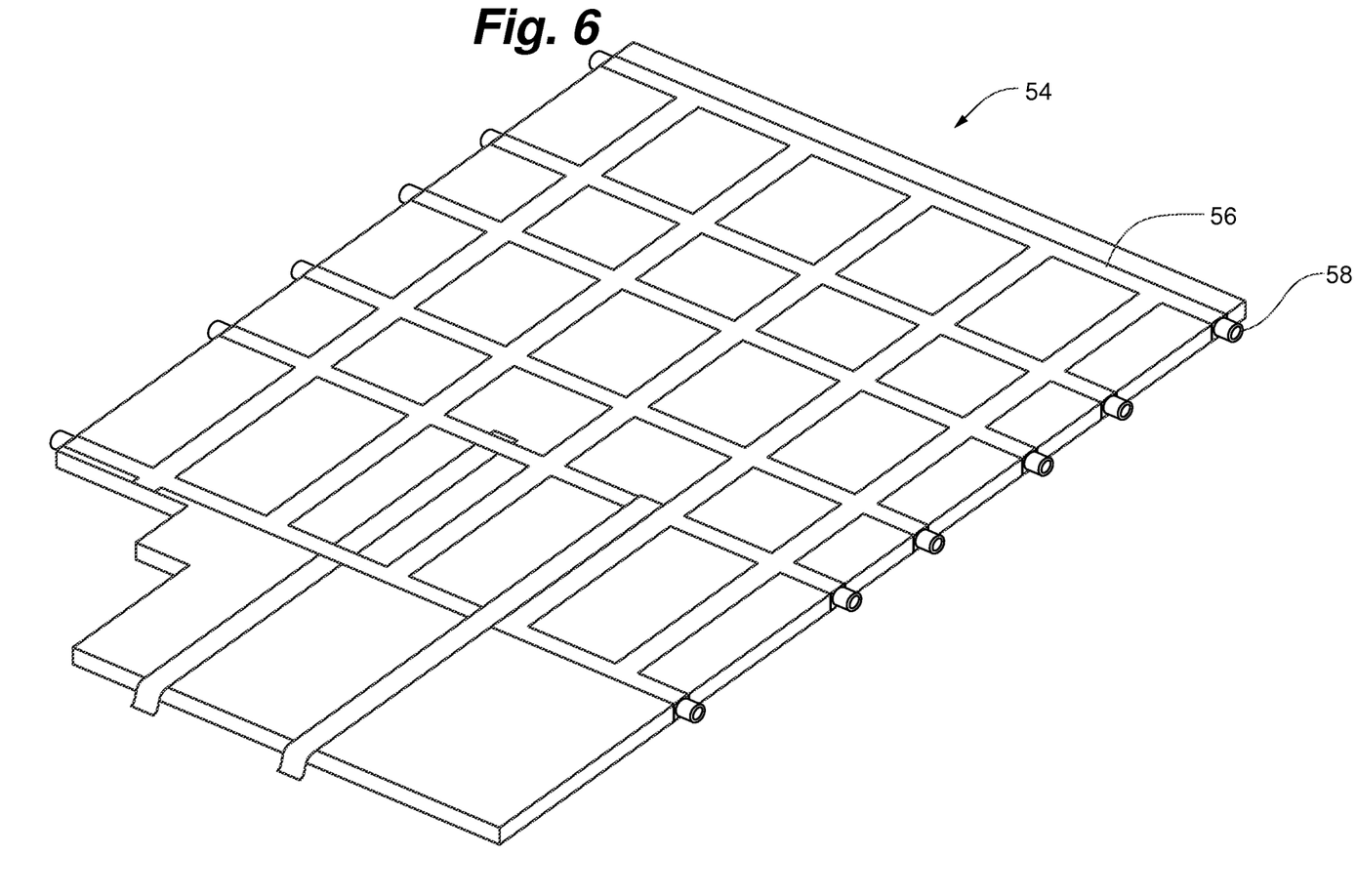
FIG. 6 is a perspective view of the containment blanket of the floating floor depicted in FIG. 3.

As shown in FIGS. 2 and 6, the floating floor system 2, according to an embodiment, can further comprise a containment blanket 54 for capturing shrapnel generated from an IED or damage to the belly armor section 12. The containment blanket 54 can comprise ballistic resistant material such as, but not limited to, KEVLAR to prevent penetration of shrapnel through the blanket 54. The containment blanket 54 comprises an embedded webbing 56 having metal bushings 58 at the ends of the webbing 56. The metal bushings 58 are adapted to receive a fastener 60 that can be inserted through a corresponding wall mount 30, 40, 42 and through the metal bushings 58 to retain the containment blanket 54. As depicted in FIG. 6, the webbing 56 is arranged in a crisscross pattern, but can comprise any arrangement necessary to maintain the structural integrity of the blanket 54 when struck by shrapnel. According to an embodiment, separate wall brackets 62 can be mounted to the sidewalls 8 for securing the containment blanket 54.

As shown in FIG. 5, the support assembly 24, according to an embodiment, can further comprise torsion bar straps 64 each having at least one anchor bracket 66. The anchor brackets 66 are adapted to receive a fastener 68 to mount the bracket 66 to the sidewall 8 or a support beam 28, 38. In operation, the bar straps 64 are positioned perpendicular across the support beams 28, 38 and adapted to twist when the vehicle 2 is struck by an explosion to absorb and dissipate a portion of the explosive energy.

A method, according to an embodiment of the present invention, for protecting the crew compartment 6 from explosive events occurring below the vehicle 2, can generally comprise mounting at least two primary support beams 28 to the side walls 8 of the vehicle 2, wherein the support beams are positioned parallel to each other and are a predetermined distance above the belly armor section 14. At least one flooring panel 26 can then be positioned over the parallel primary support beams. At least one plate retainer 34 is then inserted through the flooring panel 26 into the underlying support beam to mount the flooring panel 26 to the corresponding support beam 28. According to an embodiment, a containment blanket can be positioned between the flooring panel 26 and the support beam 28 to capture shrapnel from or generated by the explosive device.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A floating floor assembly for an armored vehicle, said vehicle having armored side walls encircling a crew compartment and at least one belly armor panel positioned beneath the crew compartment, the floating floor assembly comprising:
   a support assembly having at least two primary support beams, wherein each primary support beams comprises at least one wall mount at each end of the support beams for securing the primary support beam to the side walls of the armored vehicle a predetermined distance above each bell armor panel;
   at least one secondary support beam having a wall mount at one end and a beam mount at the opposing end for securing the secondary support beam to at least one primary support beam, wherein the secondary support beam is generally traverse to the corresponding primary support beam, and
   at least one flooring panel further comprising at least one plate retainer for receiving at least one fastener to secure the flooring panel to at least one support beam to define an expansion gap between each flooring panel and the belly armor panel.

2. The floating floor assembly of claim 1, further comprising:
   at least one torsion bar having at least one anchor bracket, wherein the torsion bar is suspended between the primary support beams and adapted to twist in response to strain applied to the primary support beams so as to absorb and dissipate a portion of the strain.

3. The floating floor assembly of claim 1, further comprising:
   a containment blanket having a plurality of metal bushings through which a fastener can be inserted to secure the containment blanket to at least one of the wall mounts, said blanket suspended beneath each flooring panel;
   wherein the containment blanket comprises a ballistic resistant material to prevent penetration of shrapnel and other debris through the blanket.

4. The floating floor assembly of claim 3, the containment blanket further comprising an integrated steel webbing to reinforce the ballistic material against penetration by shrapnel and damage.

5. The floating floor assembly of claim 4, wherein the integrated webbing is arranged in a crisscross pattern.

6. A floating floor assembly for an armored vehicle, said vehicle having armored side walls encircling a crew compartment and at least one belly armor panel positioned beneath the crew compartment, the floating floor assembly comprising:
   a support assembly having at least two primary support beams, wherein each primary support beams comprises at least one wall mount at each end of the support beams for securing the primary support beam to the side walls of the armored vehicle a predetermined distance above each bell armor panel;
   at least one torsion bar having at least one anchor bracket, wherein the torsion bar is suspended between the primary support beams and adapted to twist in response to strain applied to the primary support beams so as to absorb and dissipate a portion of the strain, and
   at least one flooring panel further comprising at least one plate retainer for receiving at least one fastener to secure the flooring panel to at least one support beam to define an expansion gap between each flooring panel and the belly armor panel.

7. The floating floor assembly of claim 6, further comprising at least one secondary support beam having a wall mount at one end and a beam mount at the opposing end for securing the secondary support beam to at least one primary support beam, wherein the secondary support beam is generally traverse to the corresponding primary support beam.

8. The floating floor assembly of claim 6, further comprising:
   a containment blanket having a plurality of metal bushings through which a fastener can be inserted to secure the containment blanket to at least one of the wall mounts, said blanket suspended beneath each flooring panel;
   wherein the containment blanket comprises a ballistic resistant material to prevent penetration of shrapnel and other debris through the blanket.

9. The floating floor assembly of claim 8, the containment blanket further comprising an integrated steel webbing to reinforce the ballistic material against penetration by shrapnel and damage.

10. The floating floor assembly of claim 9, wherein the integrated webbing is arranged in a crisscross pattern.

* * * * *